United States Patent
Vajo

(10) Patent No.: US 8,961,661 B1
(45) Date of Patent: Feb. 24, 2015

(54) POLYMER/SCAFFOLD NANOCOMPOSITES FOR HYDROGEN STORAGE

(71) Applicant: HRL Laboratories, LLC, Malibu, CA (US)

(72) Inventor: John J. Vajo, West Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 168 days.

(21) Appl. No.: 13/659,785

(22) Filed: Oct. 24, 2012

(51) Int. Cl.
*B01J 20/00* (2006.01)
*B01J 20/28* (2006.01)

(52) U.S. Cl.
USPC .............. 96/154; 502/402; 502/436; 502/526

(58) Field of Classification Search
USPC ................ 95/90, 116, 900; 96/108, 153, 154; 206/0.7; 502/400, 439, 526; 423/648.1; 429/515, 516
See application file for complete search history.

(56) References Cited

U.S. PATENT DOCUMENTS

| | | | | |
|---|---|---|---|---|
| 5,268,097 | A * | 12/1993 | Girot et al. | 210/198.2 |
| 6,812,187 | B1 * | 11/2004 | Pak et al. | 502/180 |
| 7,037,729 | B2 * | 5/2006 | Nie et al. | 436/535 |
| 2003/0230194 | A1 * | 12/2003 | Heine et al. | 95/139 |
| 2010/0058782 | A1 * | 3/2010 | Brovchenko et al. | 62/112 |
| 2010/0089238 | A1 | 4/2010 | Miachon et al. | |

FOREIGN PATENT DOCUMENTS

JP 2007-070144 A * 3/2007

OTHER PUBLICATIONS

Machine generated English translation of JP 2007-070144 A, published Mar. 2007.*
Muller, T., et al., "Click Chemistry Finds Its Way into Covalent Porous Organic Materials"; *Agnew. Chem. Int. Ed.*, 2011, 50, pp. 11844-11845.
Nishihara, H., et al., "High-Pressure Hydrogen Storage in Zeolite-Templated Carbon"; *J. Phys. Chem. C* 2009, 113, pp. 3189-3196.
Pandey, P., et al., "Imine-Linked Microporous Polymer Organic Frameworks"; *Chem. Mater*, 2010, 22, pp. 4974-4979.
Rakotovao, V., "Influence of the mesoconfining solid on gas oversolubility in nanoliquids"; *Chemical Physics Letters*, 485, (2010), pp. 299-303.
Stadie, N.P., et al., "Zeolite-Templated Carbon Materials for High-Pressure Hydrogen Storage"; *Langmuir, ACS Publications*, 2012, 28, pp. 10057-10063.
Young, C.L., "Solubility Data Series"; vol. 5/6: Hydrogen and Deuterium, *Pergamon Press*, 32 pages.

* cited by examiner

*Primary Examiner* — Frank Lawrence
(74) *Attorney, Agent, or Firm* — Christie, Parker & Hale, LLP

(57) ABSTRACT

A system for storing hydrogen in composite materials comprising polymers in porous scaffolds. The solubility of hydrogen in polymers increases considerably when these polymers are confined to the pores of a porous scaffold, allowing enough hydrogen to be dissolved to make these composite materials practical for hydrogen storage.

14 Claims, 5 Drawing Sheets

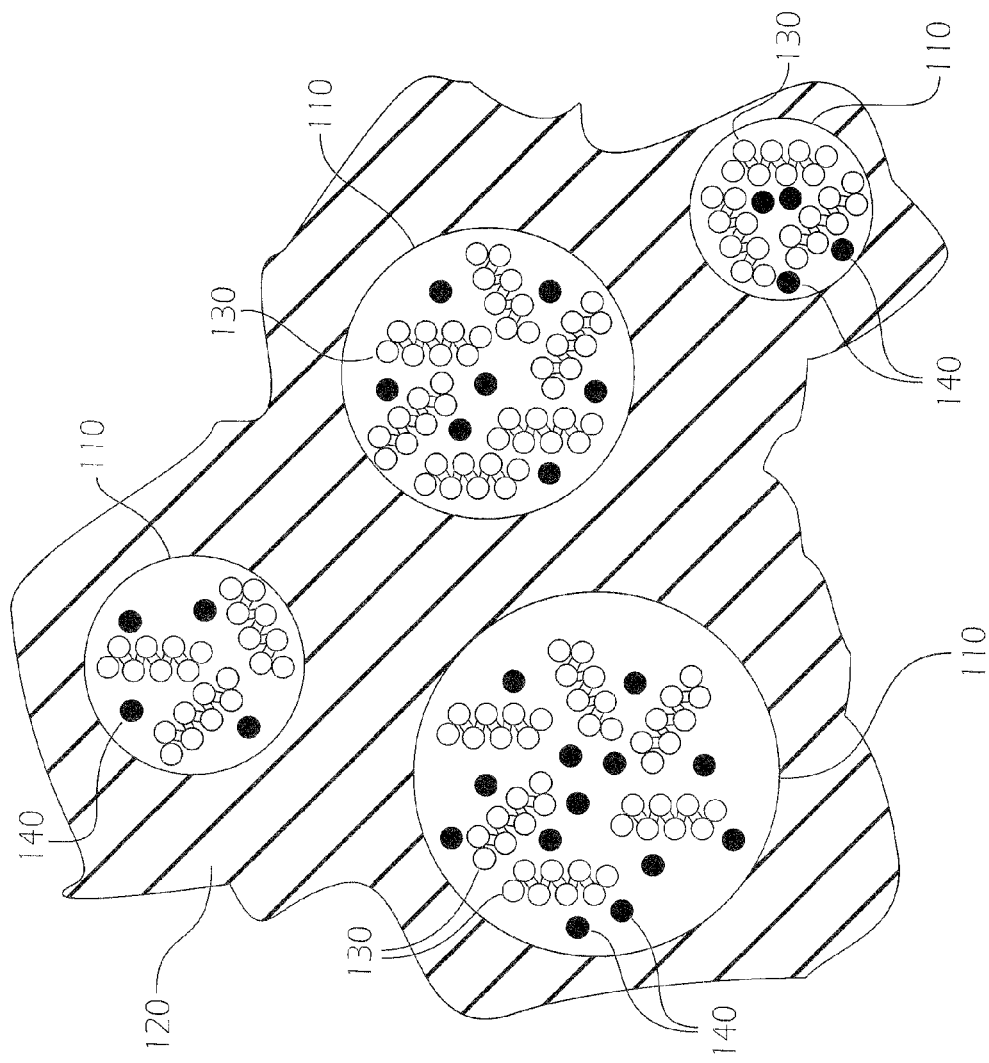
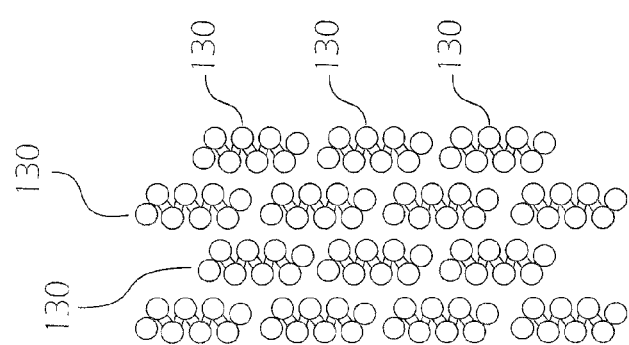

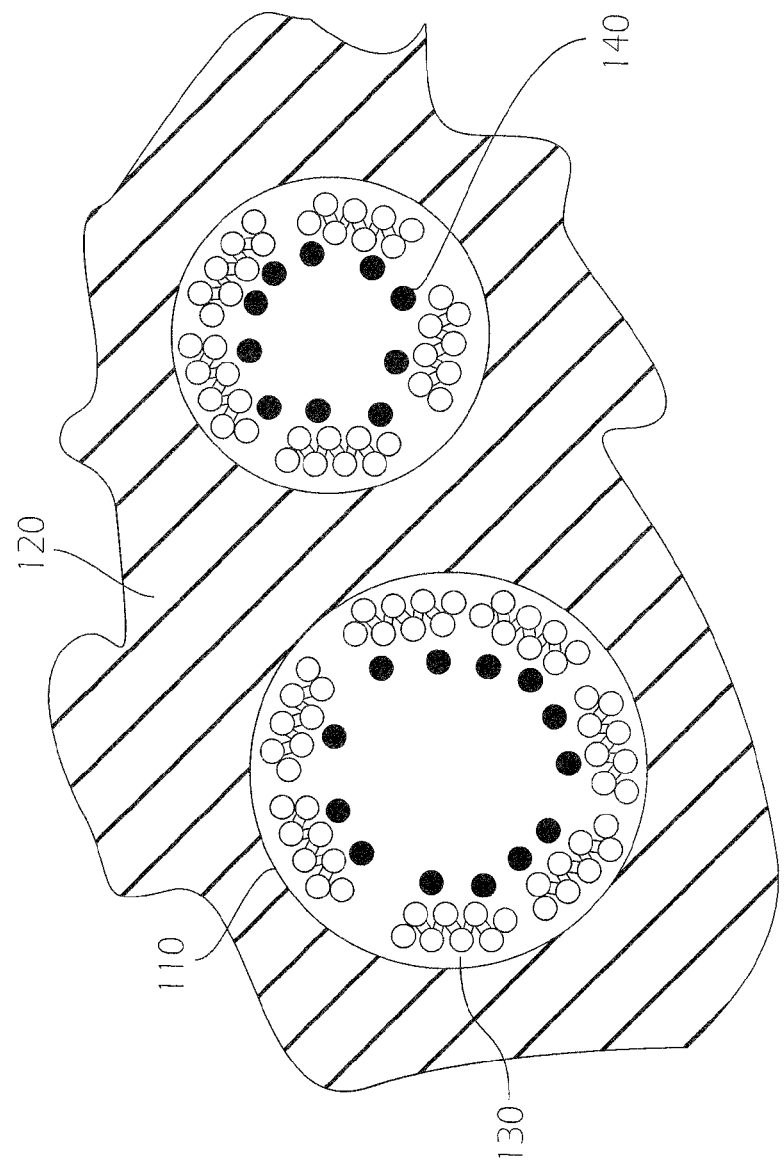

POLYMER/SCAFFOLD NANOCOMPOSITES FOR HYDROGEN STORAGE

CROSS-REFERENCE TO RELATED APPLICATION(S)

This application incorporates by reference in its entirety, as if set forth in full, U.S. patent application Ser. No. 12/329,309, filed on Dec. 5, 2008 ("the '309 Application").

FIELD

The present invention relates to hydrogen storage and more particularly to the use of a composite materials, comprising porous scaffolds and polymers, for use in hydrogen storage.

BACKGROUND

Currently, hydrogen gas for fuel cell applications is supplied from devices that store hydrogen either as compressed hydrogen gas, as cryogenic liquid hydrogen, as hydrogen atoms at low density in metallically bonded solid transition metal hydrides, as hydrogen atoms at high density in ionically bonded solid light metal hydrides, as hydrogen atoms at high density in polar covalently bonded solid complex hydrides, or as hydrogen molecules adsorbed on high surface area supports. Each of these methods has shortcomings.

Storage of hydrogen as a compressed gas requires high pressures, approaching 700 bar, in order to achieve acceptable storage densities. These pressures require significant energy for compression while also imposing engineering and safety challenges.

Liquefaction of hydrogen consumes 30% of the energy content of the hydrogen. Liquid hydrogen, at a temperature of 23 Kelvin, is also difficult to maintain over extended times without significant loss due to boil-off.

Transition metals store hydrogen as chemically bonded hydrogen atoms and, therefore, input of energy is needed to release the hydrogen. This energy is input in the form of heat to achieve elevated temperatures. The required temperatures are moderate because of the relatively weak metallic bonding that exists in transition metal hydrides. However transition metal atoms have atomic weights of greater than approximately 50 atomic mass units and store at most approximately two hydrogen atoms per transition metal atom. The hydrogen storage capacity of a storage medium may be quantified as the mass fraction of hydrogen when the medium is saturated with hydrogen. In the case of transition metal hydrides, for example, the storage capacity, which may also be referred to as the gravimetric storage density, is less than 4 percent by weight (wt %) hydrogen, which is too low for many applications.

Light metal atom hydrides can have high hydrogen storage capacities, up to approximately 12 wt % hydrogen. However, the ionic chemical bonds between the metal and the hydrogen in these hydrides are very strong and, therefore, very high temperatures, such as 280° C. and up to over 900° C., are needed to release the hydrogen. These temperatures are impractical for many applications.

Hydrogen stored in polar covalently bonded light metal complex hydrides can have hydrogen storage capacities up to 18 wt % hydrogen. Like light metal hydrides, these compounds are generally very strongly bound and therefore the high temperatures are required to release the hydrogen.

Hydrogen molecules, adsorbed on high surface area supports, are weakly bound. As a result, at moderately high pressures, for example at approximately 100 bar, cryogenic temperatures (typically 77 Kelvin, which is the temperature of liquid nitrogen) are needed to achieve high hydrogen storage capacities. These high surface area supports include nanoporous polymers, which have been reported to store in excess of 4 wt % hydrogen at approximately 75 bar and 77 K.

At room temperature, which avoids the need for cryogenic cooling, the hydrogen storage capacities of high surface area adsorbents are generally too low for widespread practical applications. For example, one of the best performing activated carbon materials, MSC-30, which has a surface area of 2680 $m^2$/g, may have a hydrogen storage capacity of 1.2 wt % at 340 bar, while a zeolited-templated carbon material with a BET surface area of 3800 $m^2$/g (i.e., a surface area measured using the method of Brunauer, Emmett, and Teller), has a hydrogen storage capacity of 2.2 wt % at 340 bar. For these and many other porous carbon materials the hydrogen storage capacity varies approximately linearly with specific surface area.

Hydrogen may also be stored by dissolution into an appropriate liquid solvent because hydrogen is soluble to some extent in most solvents, but the dissolved hydrogen content, i.e., the hydrogen storage capacity, is much too low for practical hydrogen storage. For example, at room temperature the solubility of hydrogen in hexane gives a hydrogen storage capacity of only 0.18 wt % hydrogen at 100 bar, and only 0.97 wt % at 700 bar.

Recently, as described for example in the '309 Application, the possibility of hydrogen storage in nano-confined liquids has been proposed. When confined within a porous solid, the solubility in a variety of liquids of several gasses including hydrogen has been reported to increase up to 50 times. A disadvantage of this approach is that the liquid solvents typically have appreciable vapor pressures, and, as a result, the discharged hydrogen may be contaminated by the solvent vapor to an extent which is unacceptable in some applications. Proton exchange membrane fuel cells, for example, require high purity hydrogen because the platinum (Pt) catalyst, which dissociates the hydrogen at the fuel cell anode, is very susceptible to poisoning from contaminants such as solvent vapors. Thus, when nano-confined liquids are used to store hydrogen for subsequent use in a proton exchange membrane fuel cell, additional measures are required in order to purify the hydrogen after recovery from the storage material. Moreover, over the course of repeated cycles of hydrogen storage and recovery, there will be a steady loss of the solvent liquid.

Thus, there is a need for a hydrogen storage medium with high hydrogen storage capacity at or near standard temperature and pressure, with low energy cost for storage and recovery, and which provides for the recovery of high purity hydrogen.

SUMMARY

The present invention relates to the storage of hydrogen. The solubility of hydrogen is considerably higher in a solid polymer when this polymer is confined within the pores of a porous scaffold. The enhanced solubility makes a porous scaffold containing solid polymer in its pores a practical hydrogen storage medium.

According to an embodiment of the present invention there is provided a system for storing a gas, including: a porous scaffold material, including a plurality of pores, the pores having a size less than 100 nm and greater than 0.5 nm, and the pores containing a solid polymer.

In one embodiment, the porous scaffold material and the polymer are adapted to store hydrogen gas.

In one embodiment, the porous scaffold material is selected from the group consisting of porous gamma-alumina, porous silica, MCM-41, aerogel silica, zeolite, porous carbon, activated carbon, carbon aerogel, template porous carbon, zeolite template carbon, mesoporous carbon, metal-organic frameworks, and combinations thereof.

In one embodiment, the polymer is selected from the group consisting of polyethylene, polytetrafluoroethylene, nanoporous polymers, and combinations thereof.

In one embodiment, the porous scaffold material has a pore volume of more than 0.1 cubic centimeter per gram.

In one embodiment, the solid polymer contained in the pores occupies more than 0.01 and less than 0.99 of the volume of the pores.

According to an embodiment of the present invention there is provided a method of fabricating a system for storing a gas, the method including: securing a porous scaffold material, the porous scaffold material including a plurality of pores having a size less than 100 nm and greater than 0.5 nm; and providing a solid polymer in the pores.

In one embodiment, the providing of the solid polymer in the pores includes infusing a liquid polymer precursor into the pores; and allowing the liquid polymer precursor to form the solid polymer.

In one embodiment, the providing of the solid polymer in the pores includes: infusing the polymer, in molten form, into the pores; and allowing the molten polymer to solidify.

In one embodiment, the porous scaffold material and the polymer are selected to store hydrogen gas.

In one embodiment, the porous scaffold material is selected from the group consisting of porous gamma-alumina, porous silica, MCM-41, aerogel silica, zeolite, porous carbon, activated carbon, carbon aerogel, template porous carbon, zeolite template carbon, mesoporous carbon, metal-organic frameworks, and combinations thereof.

In one embodiment, the polymer is selected from the group consisting of polyethylene, polytetrafluoroethylene, nanoporous polymers, and combinations thereof.

In one embodiment, the porous scaffold material has a pore volume of more than 0.1 cubic centimeter per gram.

In one embodiment, the solid polymer contained in the pores occupies more than 0.01 and less than 0.99 of the volume of the pores.

According to an embodiment of the present invention there is provided a method of storing and recovering a gas, the method including: fabricating a system for storing the gas; exposing the system to the gas at high partial pressure to store the gas in the system; and exposing the system to the gas at low partial pressure to recover the gas from the system.

In one embodiment, the gas is hydrogen gas.

In one embodiment, the exposing of the system to the gas at low partial pressure results in a recovery of hydrogen of at least 99.7% purity by volume.

BRIEF DESCRIPTION OF THE DRAWINGS

These and other features and advantages of the present invention will become appreciated as the same become better understood with reference to the specification, claims and appended drawings wherein:

FIG. 1A is an illustration of polymer molecules in bulk solid;

FIG. 1B is an illustration of polymer molecules and dissolved hydrogen within the pores of a porous scaffold according to an embodiment of the present invention;

FIG. 1C is an illustration of polymer molecules and dissolved hydrogen within the pores of a porous scaffold according to another embodiment of the present invention;

DETAILED DESCRIPTION

Figure 2:
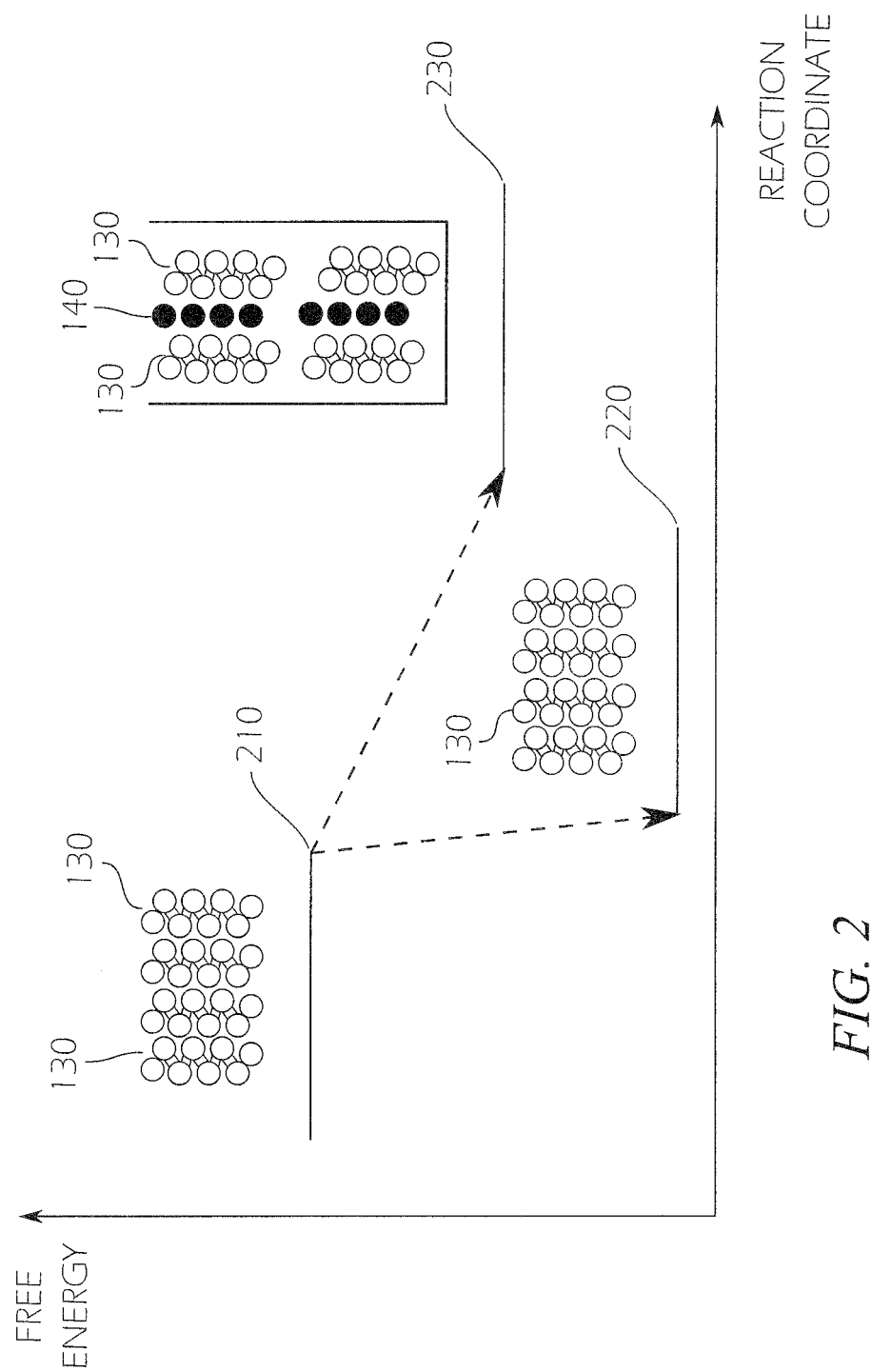
FIG. 2 is a graph of free energy as a function of reaction coordinate according to an embodiment of the present invention.

The detailed description set forth below in connection with the appended drawings is intended as a description of the presently preferred embodiments of polymer/scaffold nanocomposites for hydrogen storage provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The permeability of polymers to many gasses including hydrogen is widely measured and studied. This permeability (P) may be decomposed into a product of the diffusion coefficient (D) and the solubility coefficient (S) written as $P=D \cdot S$. The solubility of hydrogen in polymers is not widely appreciated, however. The solubility of hydrogen in polymers can be similar to that of liquid solvents. For example, assuming a linear dependence of the dissolved hydrogen concentration on hydrogen pressure, the dissolved concentration of hydrogen in low density polyethylene, having a density of 0.914 g/cm$^3$, is 0.16 percent by weight (wt %) at 100 bar. Similarly, the solubility of hydrogen in polytetrafluoroethylene (TEFLON™) is 0.2 wt % at 100 bar. These values are similar to the solubility of hydrogen in hexane.

The solubility of hydrogen in polymers is expected to increase if the polymers are incorporated into porous, and, particularly, nanoporous, scaffolds. Such an increase would make these polymer/scaffold nanocomposites suitable for practical hydrogen storage applications.

Referring to FIG. 1B, in one embodiment, the polymer molecules 130 confined within the pores 110 of the porous scaffold 120 may be constrained by the walls of the pores and consequently unable to assume a more regular, and denser, packing structure, which these molecules may assume in bulk polymer material (FIG. 1A). The resulting disruption of the structure of the polymer molecules may result in increased solubility of hydrogen molecules 140. In another embodiment (FIG. 1C), the polymer molecules may coat the interior surfaces of the pores without filling the pores, which again may make it energetically more favorable for hydrogen molecules 140 to dissolve in the solid polymer than it is in the bulk solid polymer. In one embodiment the pores are sufficiently small that the solubility of hydrogen in the solid polymer in the pores is significantly greater than the solubility of hydrogen in bulk solid polymer, and the pores are no greater than 100 nm in diameter, or in their smallest dimension if they are not substantially spherical. In one embodiment, the pores are at least 0.5 nm in their smallest dimension.

Referring to FIG. 2, a polymer in the bulk form 210 may transition to a state 220 of lower free energy by becoming absorbed in a macro-pore, i.e., a pore sufficiently large for the polymer molecules to maintain the structure they would form in bulk. If, instead, the polymer is in a small pore, its structure may be disrupted from the bulk structure, as a result of being constrained by the walls of the pore. Such a state 230 may have an intermediate free energy and may enhance the solubility of hydrogen molecules 140.

Incorporating or forming the polymer within the pores of the porous scaffold may increase the solubility of hydrogen in the polymer relative to the solubility in the bulk polymer. This increase may be large, up to more than a factor of ten. Such a large increase can make the dissolved hydrogen concentration in the nano-confined polymer high enough for practical hydrogen storage applications. The nano-confined polymer may be any of those known in the art that have the required hydrogen solubility and that can be incorporated or formed within the pores of the porous scaffold. Common examples are polyethylene and TEFLON™ (polytetrafluoroethylene). The polymer may also be a nanoporous polymer, such as a "click" chemistry-based porous polymer or an imine-based porous polymer, which may also be referred to as a porous organic polymer, or as a nanoporous polymer. The polymer may fill the pores entirely or it may fill them only partially, in one embodiment filling between 0.01 and 0.99 of the volume of the pores.

The porous scaffold may be any known in the art with appropriate characteristics of skeletal density, pore volume, pore size, pore size distribution, and surface chemistry. In particular, the scaffold may be porous gamma-alumina, porous silica, MCM-41 (Mobil Composition of Matter 41), aerogel silica (as in the '309 Application), or zeolite, porous carbon, activated carbon, carbon aerogel, or template porous carbon such as zeolite template carbon or mesoporous carbon. In one embodiment, the porous scaffold may be a metal-organic framework (MOF). To be practical, the skeletal density should be less than 5 g/cm$^3$, the pore volume should exceed 0.1 cm$^3$/g, and the pore size should be less than 100 nm. Generally, polymers have negligible vapor pressures. Volatile contaminants mixed with a polymer after fabrication, such as residual monomers or solvents used for fabrication, may be largely removed by an outgassing step. As a result, hydrogen recovered from solution in a solid polymer may have considerably higher purity than hydrogen recovered from solution in a liquid solvent.

Figure 3:
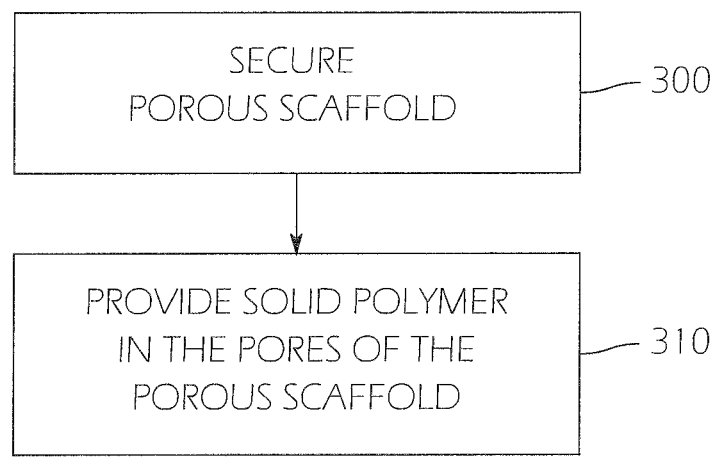
FIG. 3 is a flow chart illustrating the steps in forming polymer/scaffold nanocomposites for hydrogen storage according to an embodiment of the present invention.

Referring to FIG. 3, polymer/scaffold nanocomposites for hydrogen storage may be formed in a first step 300, in which a porous scaffold is secured, and a second step 310, in which solid polymer is provided in the pores of the porous scaffold. In one embodiment, the solid polymer may be provided within the pores of the porous scaffold by infusing the polymer in its liquid phase into the pores of the porous scaffold, and then allowing the liquid polymer to solidify, e.g., by cooling the polymer/scaffold nanocomposite. In another embodiment, a polymer/scaffold nanocomposite may be formed by infusing one or more liquid monomers or other fluid precursors, from which the solid polymer may be formed, into the pores of the porous scaffold, and allowing the polymerization reaction to take place, forming the solid polymer within the pores of the porous scaffold. The polymerization reaction may be assisted or accelerated by, for example, exposure to light, or by curing with a catalyst, radiation, or heat. Any residual species remaining after the polymerization reaction has taken place may subsequently be rinsed out or removed in an outgassing step.

Figure 4:
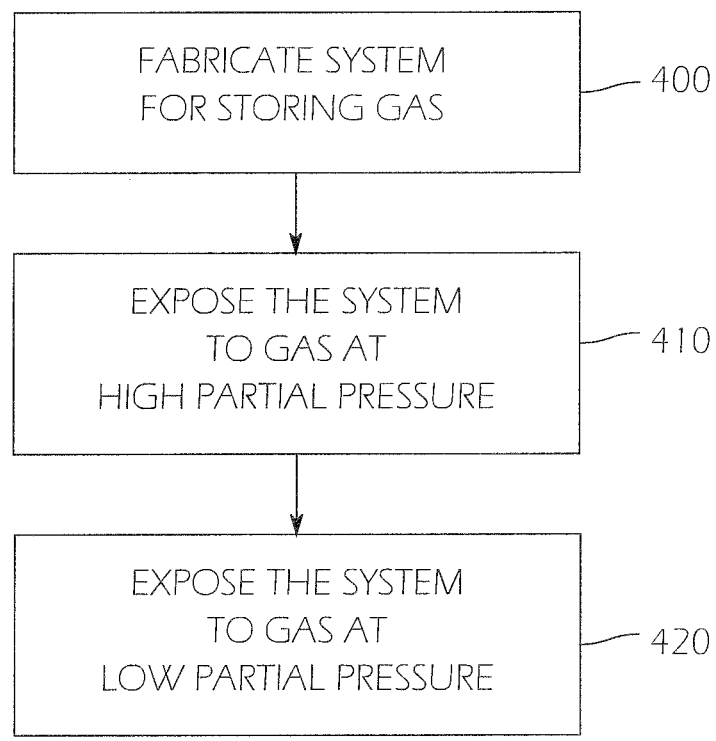
FIG. 4 is a flow chart illustrating the steps in storing and recovering gas according to an embodiment of the present invention.

For a polymer/scaffold nanocomposite for hydrogen storage that follows Henry's law, such that the equilibrium hydrogen capacity is proportional to the partial pressure of hydrogen gas surrounding the polymer/scaffold nanocomposite, the hydrogen content in the polymer/scaffold nanocomposite may be increased, or decreased, by increasing, or decreasing, this partial pressure. In particular, referring to FIG. 4, after the polymer/scaffold nanocomposite has been fabricated in step 400 by one of the methods disclosed above, hydrogen gas may be stored in the polymer/scaffold nanocomposite by exposing it, in step 410, to hydrogen gas at high pressure. The hydrogen gas may subsequently be recovered by reducing, in step 420, the partial pressure to which the polymer/scaffold nanocomposite is exposed.

Example

Low density polyethylene (density=0.914 g/cm$^3$) has a hydrogen solubility of $1.58 \times 10^{-6}$ cm$^3$(H$_2$@STP)/(cm$^3$·Pa), where STP refers to standard temperature and pressure, viz., 273.15 degrees K and 1 atm, where 1 atm is $1.01 \times 10^5$ Pa. This solubility is equivalent to $1.56 \times 10^{-3}$ wt %/atm-H$_2$, where atm-H$_2$ refers to the partial pressure, in atm, of hydrogen, surrounding the storage medium. The dissolved hydrogen capacity is linearly proportional to pressure, which is well known for bulk polymer and liquid solvent materials, the hydrogen capacity of bulk low density polyethylene at 100 atm-H$_2$ is 0.16 wt %. Similarly, at 200 atm-H$_2$, the capacity is 0.32 wt %. Nano-confining low density polyethylene within the pores of a nanoporous carbon aerogel scaffold with a narrow pore size distribution with a mode pore size (i.e., a most probable pore size) of approximately 10 nm increases the hydrogen solubility by ten times. Thus, at 200 bar-H$_2$ the hydrogen capacity of nano-confined low density polyethylene is 3.2 wt %. This is equivalent to storing 0.032 g of hydrogen in each gram of the hydrogen-saturated polymer. Selecting an aerogel with a pore volume of 2 cm$^3$/g-aerogel enables 1.828 g of low density polyethylene to be nano-confined within 1 g of aerogel. This mass of polymer will contain 0.059 g-H$_2$ at 200 bar-H$_2$. Overall, the nano-confined low density polyethylene/carbon aerogel composite stores 0.059 g-H$_2$ in 1.828 g polymer and 1 g aerogel, which corresponds to a hydrogen content of 0.059·100%/(1.828+1), or approximately 2 wt %.

Although embodiments of polymer/scaffold nanocomposites for hydrogen storage have been specifically described and illustrated herein, many modifications and variations will be apparent to those skilled in the art. For example, gases other than hydrogen, such as carbon dioxide, may be stored by methods similar to those disclosed herein. Accordingly, it is to be understood that polymer/scaffold nanocomposites for hydrogen storage constructed according to the principles of the present invention may be embodied other than as specifically described herein. The invention is also defined in the following claims, and equivalents thereof.

What is claimed is:
1. A system for storing a gas, comprising:
a porous scaffold material, comprising a plurality of pores,
the pores having a size less than 100 nm and greater than 0.5 nm, and
the pores containing a solid polymer,
wherein the polymer is selected from the group consisting of polyethylene, polytetrafluoroethylene, nanoporous polymers, and combinations thereof.
2. The system of claim 1, wherein the porous scaffold material and the polymer are adapted to store hydrogen gas.

3. The system of claim 1, wherein the porous scaffold material is selected from the group consisting of porous gamma-alumina, porous silica, MCM-41, aerogel silica, zeolite, porous carbon, activated carbon, carbon aerogel, template porous carbon, zeolite template carbon, mesoporous carbon, metal-organic frameworks, and combinations thereof.

4. The system of claim 1, wherein the porous scaffold material has a pore volume of more than 0.1 cubic centimeter per gram and less than 10 cubic centimeters per gram.

5. A method of fabricating a system for storing a gas, the method comprising:
   securing a porous scaffold material, the porous scaffold material comprising a plurality of pores having a size less than 100 nm and greater than 0.5 nm; and
   providing a solid polymer in the pores,
   wherein the polymer is selected from the group consisting of polyethylene, polytetrafluoroethylene, nanoporous-polymers, and combinations thereof.

6. The method of claim 5, wherein providing the solid polymer in the pores comprises:
   infusing a liquid polymer precursor into the pores; and
   allowing the liquid polymer precursor to form the solid polymer.

7. The method of claim 5, wherein the porous scaffold material and the polymer are selected to store hydrogen gas.

8. The method of claim 5, wherein the porous scaffold material is selected from the group consisting of porous gamma-alumina, porous silica, MCM-41, aerogel silica, zeolite, porous carbon, activated carbon, carbon aerogel, template porous carbon, zeolite template carbon, mesoporous carbon, metal-organic frameworks, and combinations thereof.

9. The method of claim 5, wherein the porous scaffold material has a pore volume of more than 0.1 cubic centimeter per gram.

10. The method of claim 5, wherein the solid polymer contained in the pores occupies more than 0.01 and less than 0.99 of the volume of the pores.

11. A method of fabricating a system for storing a gas, the method comprising:
    securing a porous scaffold material, the porous scaffold material comprising a plurality of pores having a size less than 100 nm and greater than 0.5 nm; and
    providing a solid polymer in the pores,
    wherein the providing of the solid polymer in the pores comprises:
    infusing the polymer, in molten form, into the pores; and
    allowing the molten polymer to solidify.

12. A method of storing and recovering a gas, the method comprising:
    fabricating a system for storing the gas by:
       securing a porous scaffold material, the porous scaffold material comprising a plurality of pores having a size less than 100 nm and greater than 0.5 nm; and
       providing a solid polymer in the pores;
    exposing the system to the gas at high partial pressure to store the gas in the system; and
    exposing the system to the gas at low partial pressure to recover the gas from the system.

13. The method of claim 12, wherein the gas is hydrogen gas.

14. The method of claim 13, wherein the exposing of the system to the gas at low partial pressure results in a recovery of hydrogen of at least 99.7% purity by volume.

* * * * *